(12) United States Patent
Paddick et al.

(10) Patent No.: US 12,436,349 B2
(45) Date of Patent: Oct. 7, 2025

(54) FIBER ROUTING INSERT AND OPTICAL JUNCTION OR DISTRIBUTION BOX

(71) Applicant: Prysmian S.p.A., Milan (IT)

(72) Inventors: Nathan Paddick, Milan (IT); Simon James Frampton, Milan (IT)

(73) Assignee: PRYSMIAN S.p.A., Milan (IT)

( * ) Notice: Subject to any disclaimer, the term of this patent is extended or adjusted under 35 U.S.C. 154(b) by 295 days.

(21) Appl. No.: 18/124,898

(22) Filed: Mar. 22, 2023

(65) Prior Publication Data
US 2023/0305256 A1   Sep. 28, 2023

(30) Foreign Application Priority Data
Mar. 22, 2022   (IT) .................. 102022000005621

(51) Int. Cl.
G02B 6/44   (2006.01)

(52) U.S. Cl.
CPC ....... *G02B 6/4471* (2013.01); *G02B 6/44515* (2023.05)

(58) Field of Classification Search
CPC .......................... G02B 6/4471; G02B 6/44515
See application file for complete search history.

(56) References Cited

U.S. PATENT DOCUMENTS

| 5,450,518 A | * | 9/1995 | Burek | .................. | G02B 6/4454 |
| | | | | | 385/135 |
| 9,535,226 B2 | * | 1/2017 | Simmons | ............. | G02B 6/4471 |

FOREIGN PATENT DOCUMENTS

WO   WO2017/133764   8/2017

OTHER PUBLICATIONS

International Search Report and Written Opinion for Italian application No. IT202200005621 mailed Nov. 15, 2022.

* cited by examiner

*Primary Examiner* — Sung H Pak
(74) *Attorney, Agent, or Firm* — Haynes and Boone, LLP

(57) ABSTRACT

A fiber routing insert for an optical junction or distribution box, having: a first floor; first guide elements extending, along a spacing direction transversal to the first floor, from the first floor to first ceiling portions, the first guide elements defining a first path on the first floor configured to receive optical fibers, the first path defining a figure-eight fiber locking path; a second floor arranged at a raised position relative to the first floor and spaced apart from the first floor along the spacing direction, the second floor having a splicing area for splicing the optical fibers on the second floor; second guide elements arranged on the second floor, the second guide elements defining a second path on the second floor configured to receive optical fibers, a connecting element configured to guide optical fibers from the first path to the second path, the first ceiling portions define the second floor.

17 Claims, 8 Drawing Sheets

FIBER ROUTING INSERT AND OPTICAL JUNCTION OR DISTRIBUTION BOX

FIELD OF THE INVENTION

The present invention relates to the field of equipment and components for the installation of optical cables in optical access networks. In particular, the present invention relates to a fiber routing insert for an optical junction or distribution box for locking and splicing fiber. The present invention further relates to an optical junction or distribution box for accommodate the fiber routing insert.

BACKGROUND OF THE INVENTION

A FTTH ("Fiber To The Home") network is an optical access network providing a number of end customers with broadband communication services from operators, i.e. with services requiring data transmission at a very high rate, for example of some Mbit/s.

Typically, a FTTH network comprises a multiple junction or distribution boxes which cooperate with an access network and which may be installed in or near the basement of the building where end users reside, in an underground pit, on a wall, or on a pole. Optical cables exiting the junction or distribution boxes can be routed directly to the customer or to further junction or distribution boxes, for example arranged at different floors of the building.

A known multiple junction or distribution box comprises an insert made of two hinged parts. One of the parts is configured to retain the fiber and the other part is used to splice the fiber received from the first part.

An installed optical junction or distribution box and a relative insert may be opened for example for maintenance issues or for changing some fiber connections therein. During such operations there is a significant risk of fiber damage, especially in case of multiple intersecting fibers passing between the parts. Furthermore, such insert has a complex structure causing the increase of costs and production time as well as the space waste.

WO 2014/003826 discloses a multifunction CSP (MCSP), and a MCSP/ONT assembly that is adapted for mounting inside the customer premises. In the MCSP/ONT assembly the MCSP subunit and the ONT subunit are stacked and attached directly together. The MCSP/ONT assembly combines the functions of the standard CSP box and the ONT box, thus eliminating the need for the building cable. In addition the MCSP subunit is adapted to integrate more than one ONT in the MCSP/ONT assembly. The MCSP subunit comprises a back box, a splice tray, and a cover.

U.S. Pat. No. 5,896,486 discloses a mass splice tray for holding a plurality of optical fiber splices, such as mechanical or fusion type splices for optical fiber ribbons, has a floor and front and rear and end walls defining an interior of the tray. A support shelf extends from the rear wall into the interior, spaced from the floor, for supporting splice holders above the floor at one side of the tray. Extensions on the end walls define, with the rear wall, channels for routing fiber, especially ribbon fibers, into and out of the tray. Splice holder inserts have locating means thereon for mating with locating means in the rear wall to position the inserts on the support shelf, and splice holders are dimensioned to fit within the inserts. The elevation of the splice holders permits routing slack fibers or ribbons within the interior of the tray without interference from the splice holders. Protective tabs extend from the top edges of the walls to maintain the fibers or ribbons within the tray.

SUMMARY OF THE INVENTION

The Applicant has tackled the problem of simplifying the fiber routing insert to be arranged into an optical junction or distribution box saving and optimizing the available space to store, retain and splice optical fiber.

The Applicant has found that a fiber routing insert having two overlapped floor the lower to retain the fiber and the upper to splice and route the fiber wherein guide element define a path on the first floor and at the same time the second floor, saves space and optimizes the exploitation of the available space.

Therefore, the present invention relates to a fiber routing insert for an optical junction or distribution box comprising a first floor and first guide elements extending, along a spacing direction transversal to the first floor, from the first floor to first ceiling portions, the first guide elements defining a first path on the first floor configured to receive optical fibers, the first path defining a figure-eight fiber locking path; the fiber routing insert comprises a second floor arranged at a raised position relative to the first floor and spaced apart from the first floor along the spacing direction, the second floor comprising a splicing area for splicing the optical fibers on the second floor; fiber routing insert comprises second guide elements arranged on the second floor, the second guide elements defining a second path on the second floor configured to receive optical fibers, fiber routing insert comprises a connecting element configured to guide optical fibers from the first path to the second path, the first ceiling portions define the second floor.

According to one embodiment, the first floor is arranged at a lowered position relative to the second floor along the spacing direction.

According to one embodiment, the first floor and the second floor are associated respectively to a first plane and a second plane which are at a constant distance.

According to one embodiment, the first guide elements comprise first lower central walls and second lower central walls projecting from the first floor and mutually spaced apart along a transversal direction perpendicular to the spacing direction; lower lateral walls projecting from the first floor and arranged around the first lower central walls and the second lower central walls; the lower central walls and the lower lateral walls defining therebetween the first path.

According to one embodiment, the first lower central walls and the second lower central walls have circular profiles defining respectively a first lower loop and a second lower loop; the lower lateral walls have complementary profiles with respect to the circular profiles of the first lower central walls and the second lower central walls; the first guide elements define with the lower central walls and the lower lateral walls the figure-eight fiber locking path of the first path.

According to one embodiment, the first guide elements comprise an insertion element configured to insert the optical fiber into the first path between the first lower central walls and the second lower central walls along an insertion direction perpendicular to the transversal direction.

According to one embodiment, the second guide elements project from the first guide elements along the spacing direction away from the first floor.

According to one embodiment, the second guide elements comprise first upper central walls and second upper central wall projecting from the ceiling portions respectively from the first lower central wall and the second lower central wall; upper lateral walls arranged on the ceiling portions respectively on the lower lateral wall; the upper central walls and upper lateral walls defining therebetween the second path.

According to one embodiment, the first guide elements are formed integrally in one piece with the first floor; or the first guide elements are removably attached to the first floor.

According to one embodiment, the second guide elements are formed integrally in one piece with the first guide elements; or the second guide elements are removably attached to the first guide elements.

According to one embodiment, the connecting element is configured to raise the optical fibers from the first floor to the second floor along a connecting path crossing at a raised position the optical fibers at insertion into the first path.

According to one embodiment, the second guide elements define with the second path a routing area.

The present invention further relates to an optical junction or distribution box. The optical junction or distribution box comprises a first floor and first guide elements extending, along a spacing direction transversal to the first floor, from the first floor to first ceiling portions, the first guide elements defining a first path on the first floor configured to receive optical fibers, the first path defining a figure-eight fiber locking path; the fiber routing insert comprises a second floor arranged at a raised position relative to the first floor and spaced apart from the first floor along the spacing direction, the second floor comprising a splicing area for splicing the optical fibers on the second floor and the first ceiling portions defining the second floor; fiber routing insert comprises second guide elements arranged on the second floor, the second guide elements defining a second path on the second floor configured to receive optical fibers, fiber routing insert comprises a connecting element configured to guide optical fibers from the first path to the second path. The optical junction or distribution box comprises a base associated to the first floor of the fiber routing insert; side walls projecting from the base and surrounding the fiber routing insert, one or more first optical ports, each first optical port providing a fiber access to the first path, one or more second optical ports, each second optical port providing a fiber access to the second path.

According to one embodiment, the optical junction or distribution box comprises a cover coupled to the side walls on the opposite to the base and configured to define with the base and the side walls a housing volume for the fiber routing insert.

BRIEF DESCRIPTION OF THE DRAWINGS

The present invention will now be described in more detail hereinafter with reference to the accompanying drawings, in which embodiments of the invention are shown.

DETAILED DESCRIPTION

Figure 1:
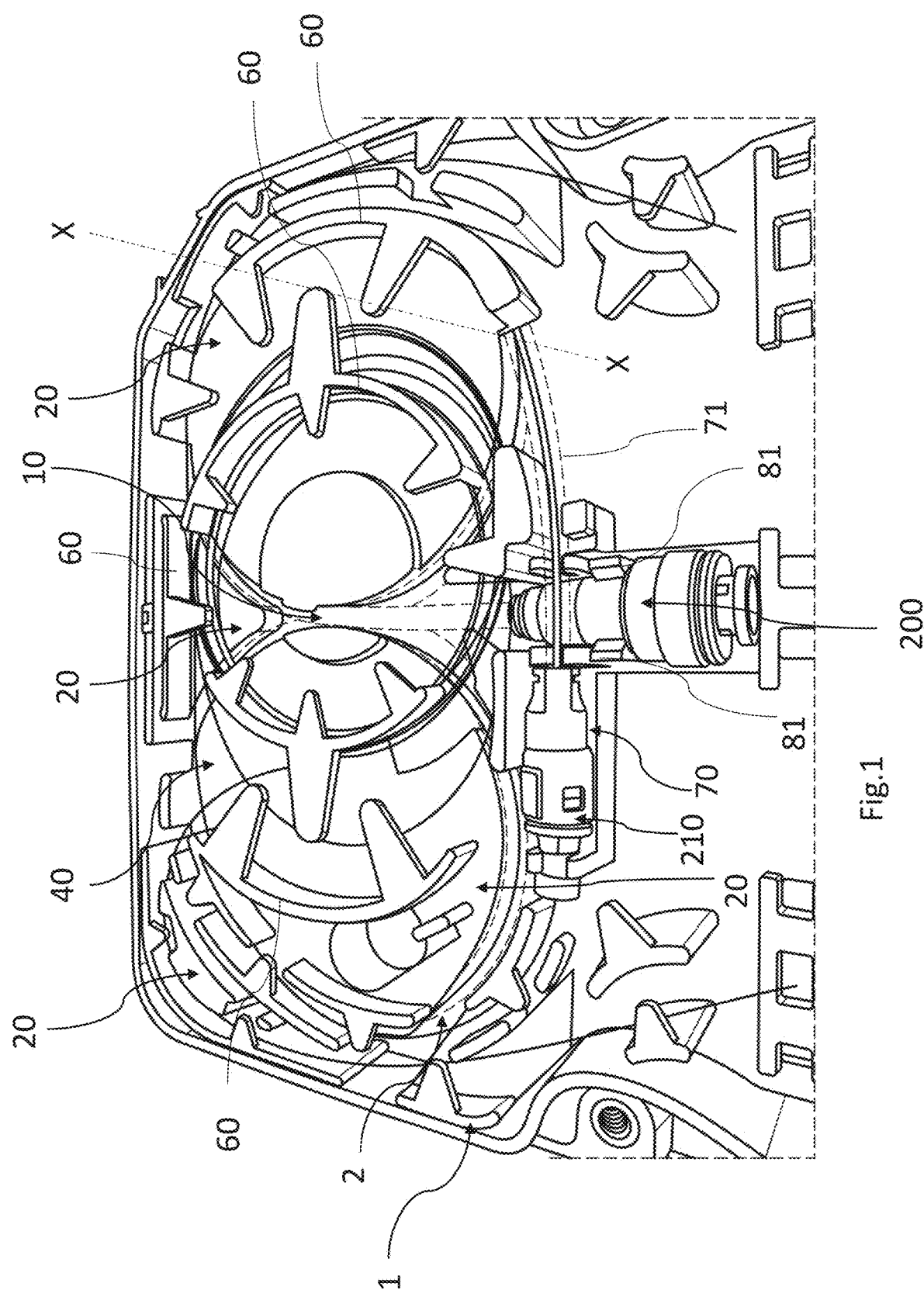
FIG. 1 is a perspective view of an optical junction or distribution box comprising an insert according to one embodiment of the invention, where some optical fiber portions are shown.
Figure 2:
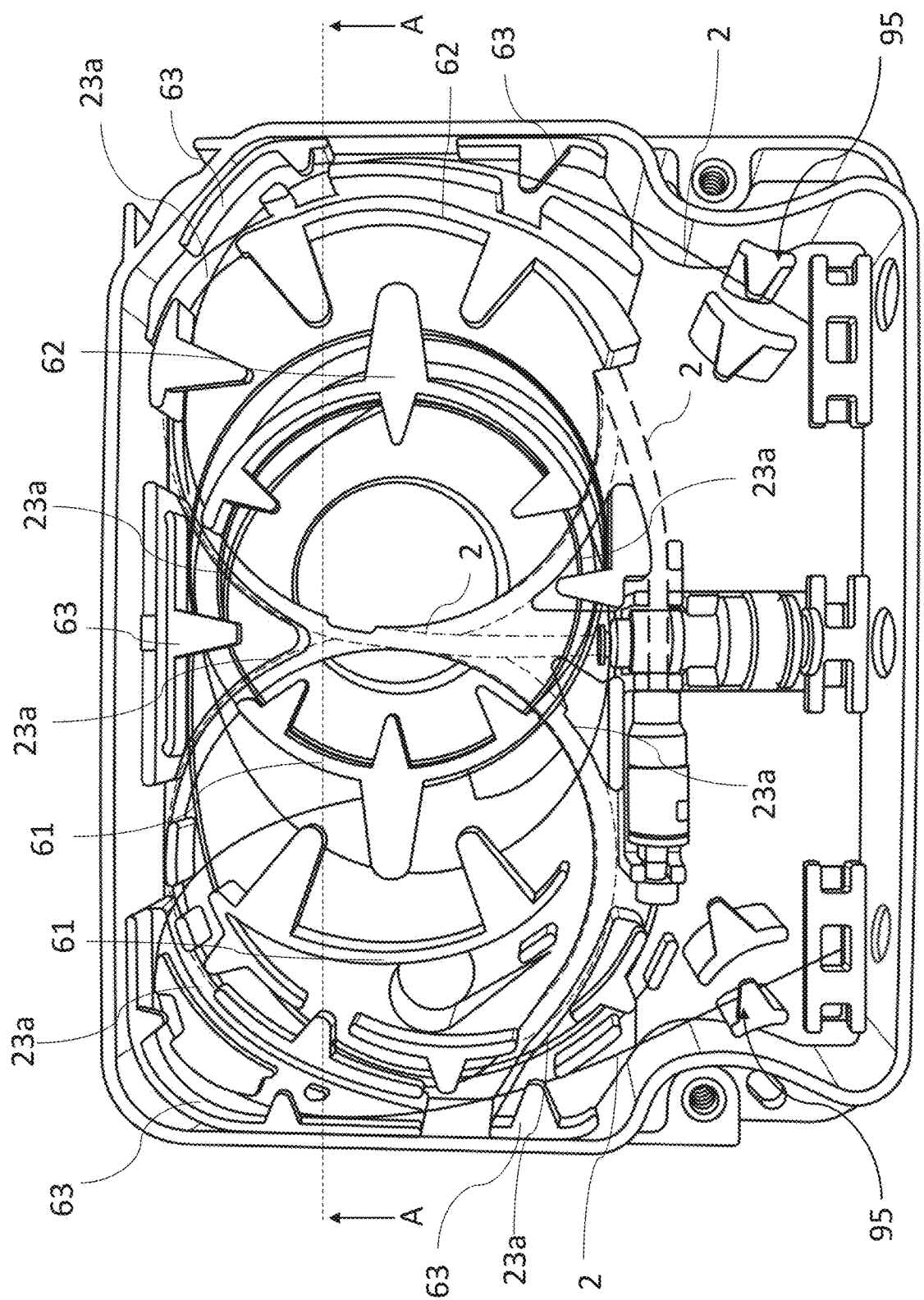
FIG. 2 is a top view of the box of FIG. 1.
Figure 3:
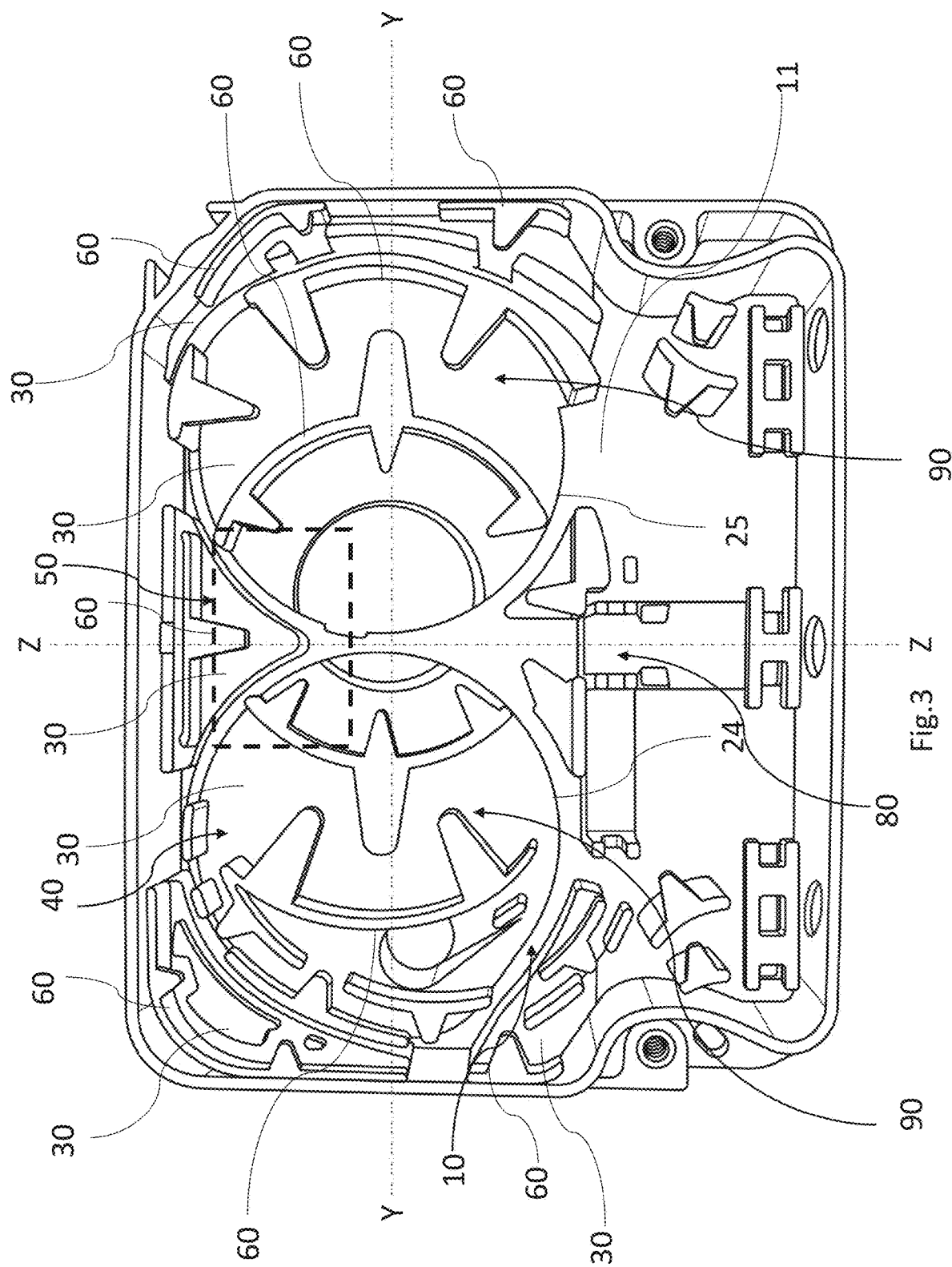
FIG. 3 is a top view of the box of FIG. 1 without optical fiber.

FIGS. 1-8 shows an optical junction or distribution box 100 and a fiber routing insert 1 housed within the optical junction or distribution box 100. In several embodiments, the fiber routing insert 1 is made of plastic material.

The fiber routing insert 1 comprises a first floor 10 and a second floor 40.

The second floor 40 is arranged at a raised position relative to the first floor 10. In detail, the first floor 10 and the second floor 40 are spaced apart along a spacing direction X-X transversal to the first floor 10, preferably perpendicular. Namely, the first floor 10 is arranged at a lowered position relative to the second floor 40 along the spacing direction X-X.

The first floor 10 and the second floor 40 define a support plane for the optical fibers 2. It is to be noted that the optical fibers 2 on the first floor 10 can be arranged in a protective sheath (in the figures indicated with the dashed lines) while on the second floor 40 the fibers 2 can be free (in the figures indicated with the continuous lines), namely out of the sheath for example for the splicing and/or further connections outside the insert 1.

The first floor 10 can be substantially a planar plane 10a (see FIG. 8) and defines an insert base 11. The second floor 40 can develop on a planar plane 40a (see FIG. 8) parallel to the planar plane 10a of the first floor 10. It is to be noted the first floor 10 and the second floor 40 can have recesses and/or protrusions with respect to the relative plane 10a, 40a of the first floor 20 and the second floor 40.

According to one embodiment, the first floor 10 and the second floor 40 are associated respectively to the first plane 10a and second plane 40a which are at a constant distance.

The fiber routing insert 1 comprises first guide elements 20 extending from the first floor 10 to first ceiling portions 30 along the spacing direction X-X. Namely, the first guide element 20 projects from the first floor 10, for example from the base 11, in the spacing direction X-X, towards the second floor 40.

The first ceiling portions 30 define the second floor 40. Namely, the assembly of the first ceiling portions 30 outline the second floor 40 defining the relative plane 40a. It is to be noted that the first ceiling portions 30 are mutually spaced apart for allowing the insertion of the optical fibers on the first floor 10. The assembly of first ceiling portion 30 defines the second floor 40 and relative plane 40a over which it is possible to route the optical fiber 2. Namely, the optical fiber 2 on the second floor 40 crosses the spacing between the first ceiling portions 30 and the spacing over the optical fiber 2 laying on the first floor 10.

According to one embodiment, the first guide elements 20 are formed integrally in one piece with the first floor 10. Alternatively, the first guide elements 20 are removably attached to the first floor 10.

Figure 4:
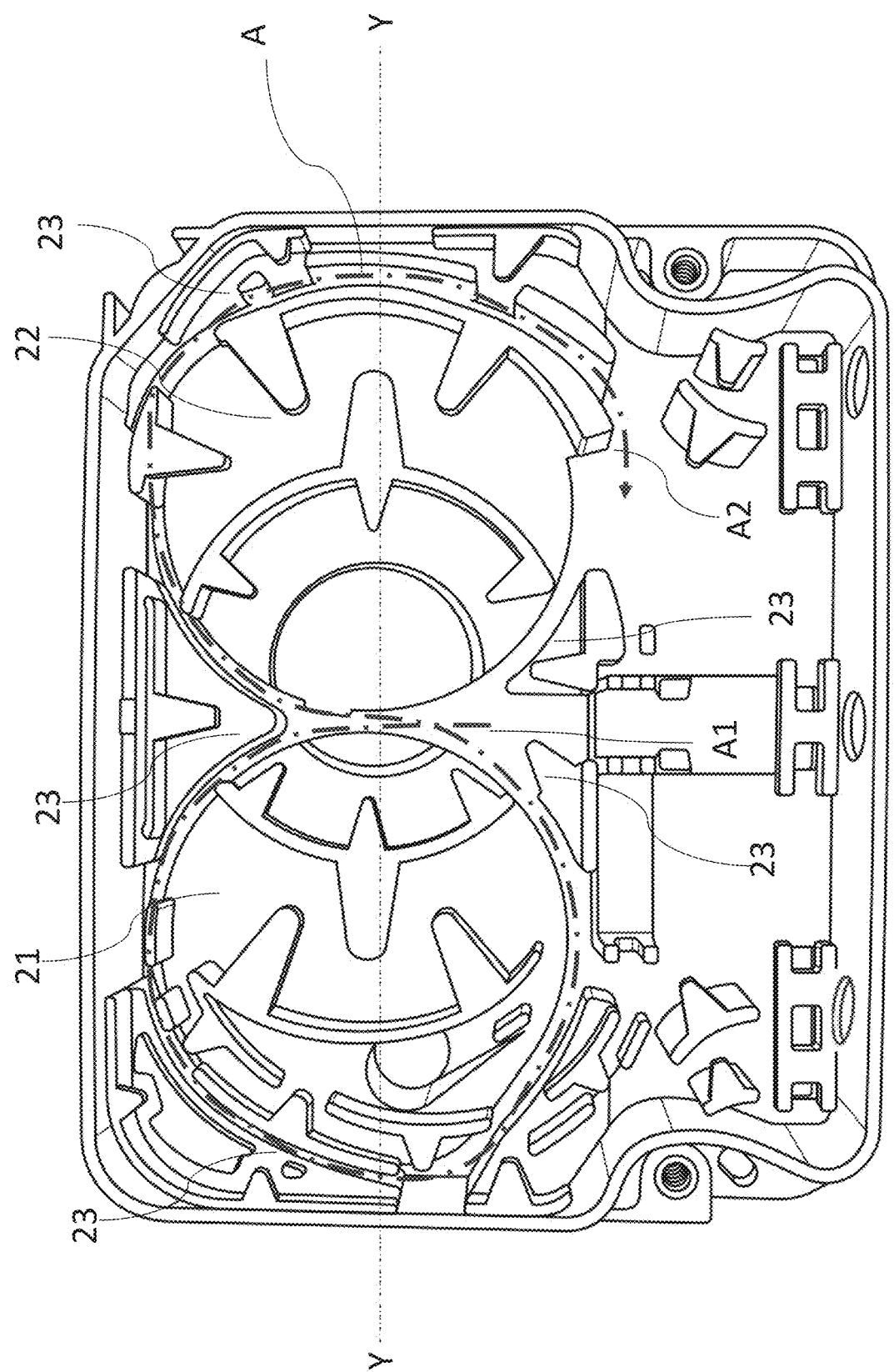
FIG. 4 is a top view of the box of FIG. 1 without optical fiber to schematically show the first path.

The first guide elements 20 define a first path A on the first floor 10 configured to receive optical fibers 2. The first path A is schematically shown in FIG. 4. Namely, the first guide elements 20 are arranged along the first floor 10 and are shaped to guide the optical fibers 2 along the first path A. In detail, the first guide elements 20 define a figure-eight fiber locking path as a first path A.

The first path A allows to firmly retain the optical fiber 2 on the first floor 10.

According to one embodiment, the first guide elements 20 comprise first lower central walls 21 and second lower central walls 22 projecting from the first floor 10. The first lower central walls 21 and the second lower central walls 22 and mutually spaced apart along a transversal direction Y-Y perpendicular to the spacing direction X-X. The first guide elements 20 comprise lower lateral walls 23 projecting from the first floor 10 and arranged around the first lower central walls 21 and the second lower central walls 22. Namely, the lower lateral walls 23 surround the first lower central walls 21 and the second lower central walls 22. In other words, the lower lateral walls 23 surround the first lower central walls 21 and the second lower central walls 22 and define with the lower central walls 21, 22 the first path A.

Accordingly, the lower central walls 21, 22 and the lower lateral walls 23 define therebetween the first path A. Namely, the walls 21, 22, 23 are mutually spaced apart along a path direction P-P perpendicular to the relative walls 21, 22, 23 in each section of the first path A.

According to one embodiment, the first lower central walls 21 and the second lower central walls 22 have circular profiles. Namely, the first lower central walls 21 and the second lower central walls 22 define respectively a first lower loop 24 and a second lower loop 25. The lower lateral walls 23 have complementary profiles with respect to the circular profiles of the first lower central walls 21 and the second lower central walls 22. Namely, the lower lateral walls 23 have an eight profile. Therefore, the first guide elements 20 define with the lower central walls 21, 22 and the lower lateral walls 23 the figure-eight fiber locking path of the first path A.

It is to be noted that the first guide elements 20 guide the optical fiber 2 around the first lower central walls 21 passing between the first central wall 21 and the second central wall 22, then around the second lower central wall 22 crossing at a raised position the optical fiber passing between the first central wall 21 and the second central wall 22 towards a first round around the first lower central walls 21. Finally, the optical fiber 2 is guided towards the second floor 40. The optical fiber 2 can be routed through the first path A one or more times.

The lower lateral walls 23 may comprise guiding portions 23a arranged around the lower central walls 21, 22 to guide the optical fiber 2 on the first floor 10 along the first path A.

According to one embodiment, the first guide elements 20 comprise an insertion element 80 configured to insert the optical fiber 2 into the first path A between the first lower central walls 21 and the second lower central walls 22 along an insertion direction Z-Z. The insertion direction Z-Z can be perpendicular to the transversal direction Y-Y. Namely, the insertion element 80 is configured to address the optical fiber 2 into the path A towards the first round around the first lower central walls 21.

The insertion element 80 can be arranged in a middle position between the first lower central walls 21 and the second lower central walls 22 avoiding incorrect bending of the optical fiber. Furthermore, the insertion element 80 can comprise retaining elements 81 for a connector 200.

According to one embodiment, the first path A has a first path insertion end A1 and a first path exit end A2. The first path insertion end A1 is arranged between the first lower central wall 21 and the second lower central wall 22 proximate to the lower lateral wall 23. Namely, the first path insertion end A1 is defined by the insertion element 80. The first path exit end A2 is arranged laterally with respect to the first path insertion end A1 at the end of a second round around the second lower central wall 22. Namely, the first path insertion end A1 is arranged in the middle of the figure eight path and the first path exit end A2 is arranged proximate to the end of the second round of the figure-eight path.

The first guide elements 20 along the first path A allow to firmly retain the optical fiber 2. According to the embodiment shown in the figures, the first guide element 20 are shaped to guide the optical fibers 2 along the loops.

The fiber routing insert 1 comprises second guide elements 60 arranged on the second floor 40. Namely, the second guide elements 60 project along the spacing direction X-X from the first guide elements 20. According to the embodiments shown in the figures, the second guide elements 60 project from the first guide elements 20, namely from the first ceiling portion 30, along the spacing direction X-X away from the first floor 10.

The second floor 40 comprises a splicing area 50 for splicing the optical fibers on the second floor 40. A spice tray, not shown, can be arranged on the splicing area 50.

According to one embodiment, the second guide elements 60 are formed integrally in one piece with the first guide elements 20. Alternatively, the second guide elements 60 are removably attached to the first guide elements 20.

The second guide elements 60 define a second path B on the second floor 40 configured to receive optical fibers 2. In fact, the second guide elements 60 are arranged along the second path B on the second floor 40 and are shaped to guide the optical fibers 2 along the second path B.

Figure 5:
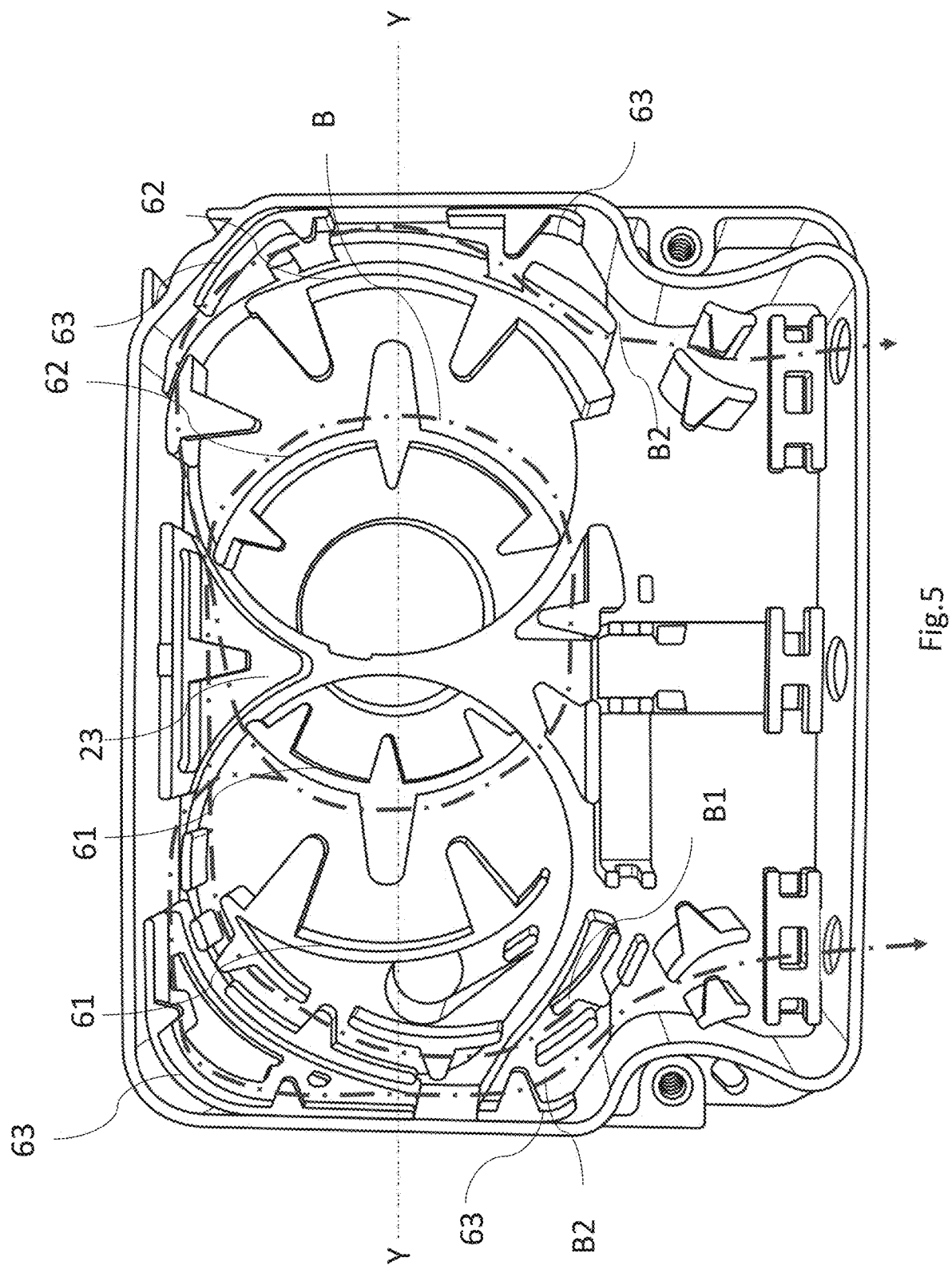
FIG. 5 is a top view of the box of FIG. 1 without optical fiber to schematically show the second path.

According to the embodiment shown in FIG. 5, the second guide elements 60 comprise first upper central walls 61 and second upper central wall 62 projecting from the ceiling portions 30 respectively from the first lower central wall 21 and the second lower central wall 22.

The second guide elements 60 comprise upper lateral walls 63 projecting from the ceiling portions respectively on the lower lateral wall 23.

The upper central walls 61, 62 and upper lateral walls 63 defining therebetween the second path B and are configured to guide the optical fibers along the second path B.

The second path B (schematically shown in FIG. 5) has a second path insertion end B1 and a second path exit ends B2. The second path insertion end B1 is arranged on the second floor 40 at a position opposite to the first path exit end A2 with respect to a plane passing between the first lower wall 21, 22. The second path exit ends B2 are arranged on the second floor 40 adjacent respectively to the second path insertion end B1 and the first exit insertion end A2. Namely, the second path exit ends B2 are arranged on the second floor 40 adjacent to the ends of the figure eight spaced along the transverse direction Y-Y.

According to one embodiment, the second guide elements 60 define with the second path B a routing area 90. The second guide elements 60 can guide the optical fiber around one or more coils defined by the upper walls 61, 62 and/or upper lateral wall 63.

According to an aspect of the invention, the fiber routing insert 1 comprises a connecting element 70 configured to guide optical fibers 2 from the first path A to the second path B. Namely, the connecting element 70 is configured to guide the optical fiber 2 exiting from the first path A towards the enter of the second path B.

The connection element 70 can retain the optical fiber 2 exiting from the first path A, for example, by means of a connector 210, causing the fiber to raise from the first floor 10 to the second floor 40.

Figure 6:
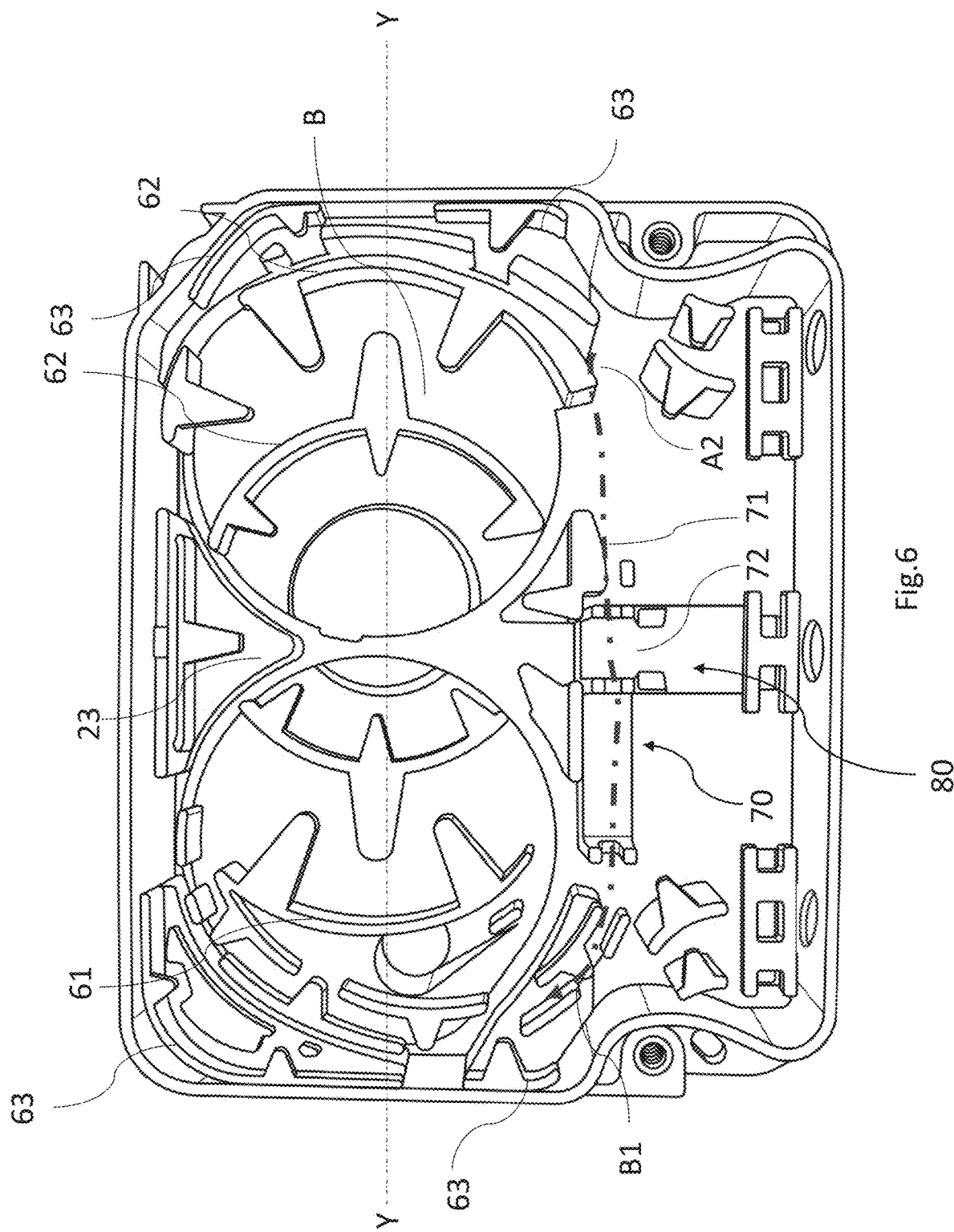
FIG. 6 is a top view of the box of FIG. 1 without optical fiber to schematically show the connection path.

According to the embodiment shown in FIG. 6, the connecting element 70 is configured to raise the optical fibers 2 from the first floor 10 to the second floor 40 along a connecting path 71 (schematically shown in FIG. 6) crossing at a raised position the optical fibers 2 at insertion into the first path A. Specifically, the connecting path 71 connects the first path exit end A2 to the second path entering end B1.

In more detail, the connecting element 70 causes the optical fiber 2 to incline with respect to the spacing direction X-X from the first floor 10 to the second floor 40.

In the embodiment of FIG. 6, the connecting path 71 has a crossing portion 72 crossing at the raised position the optical fiber entering in the first path A adjacently to the middle of the figure eight. Therefore, the connecting path 71 overpasses the insertion element 80 at the crossing portion 72. In other words, the connecting element 70 defines a flyover with respect optical fiber entering in the first path A.

It should be noted that the connecting element 70 are shaped to guide the optical fibers 2 along the connecting path 71 substantially extending along the transverse direction Y-Y.

According to one embodiment, the fiber routing insert 1 comprises exiting elements 95 configured to guide the optical fiber 2 away from the second path B towards, for example, ports of the optical junction or distribution box 100. Such exiting element 95 can be arranged on the first floor 10 or on the base 110 of the optical junction or distribution box 100. Alternatively, the exiting element 95 can be arranged on the second floor 40.

It is a further object of the present invention the optical junction or distribution box 100 configured to housing the fiber routing insert 1.

The optical junction or distribution box 100 comprises a base 110 and side walls 120 projecting from the base 110 surrounding the side walls 120. The base 110 and the side walls 120 define an open compartment 160 to house the fiber routing insert 1. Specifically, the base 110 is associated to the first floor 10 of the fiber routing insert 1 and the sides walls 120 surround the fiber routing insert 1.

Figure 7:
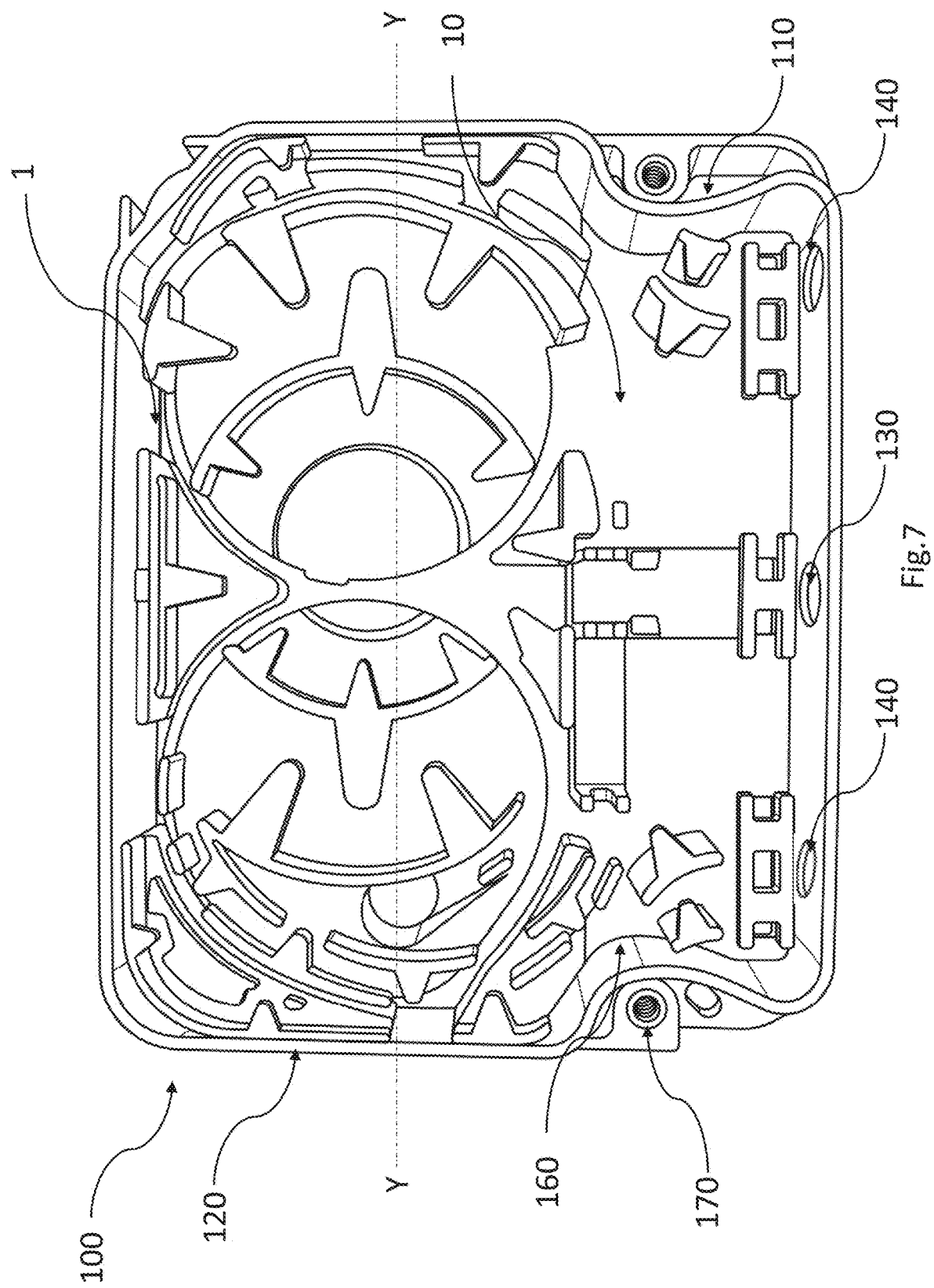
FIG. 7 is a further top view of the box of FIG. 1 without optical fiber.
Figure 8:
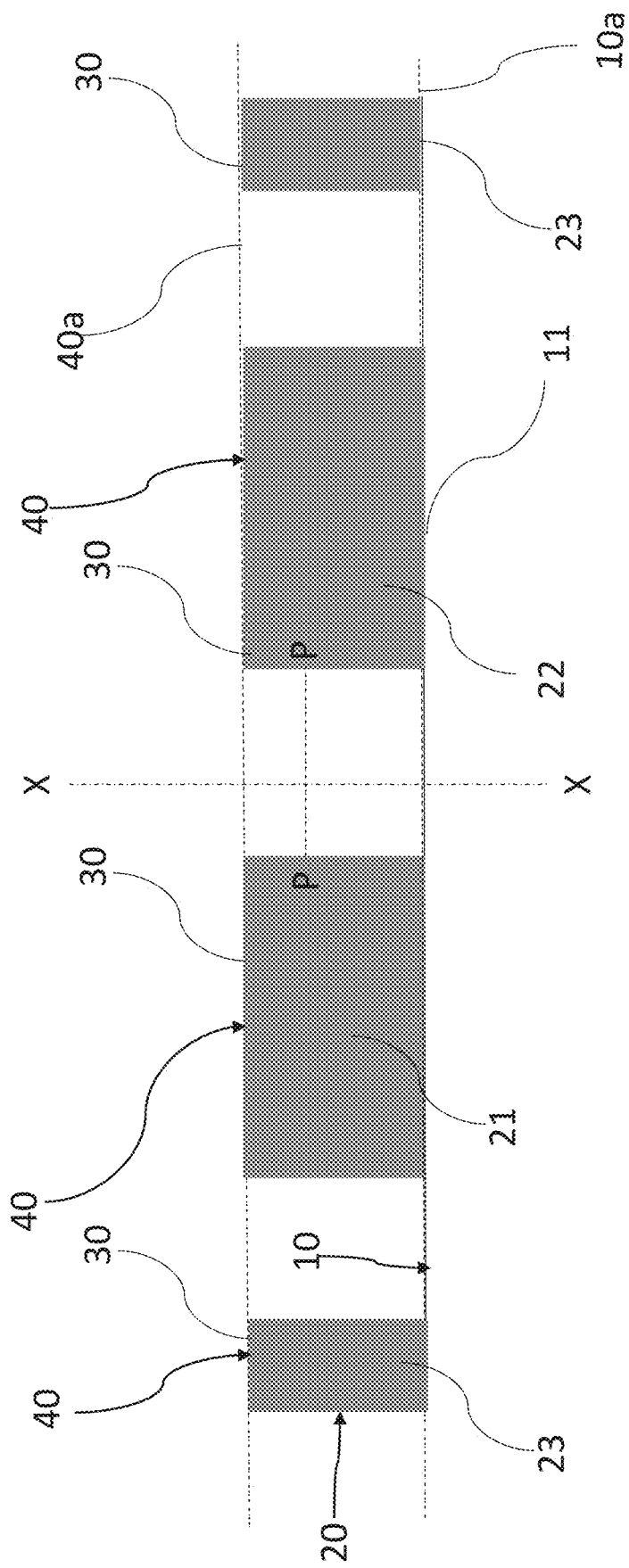
FIG. 8 is a schematically section view along the section plane A-A of FIG. 2 with some elements removed.

According to the embodiment represented in FIG. 7, the optical junction or distribution box 100 comprises a cover, not shown, coupled to the side walls 120 on the opposite to the base 110. The cover is configured to define with the base 110 and the side walls 120 a housing volume. Namely, the cover is configured to close the open compartment 160. Fastening elements 170 are configured to removably fasten the cover to the side walls 120 and/or to the base 110.

In the embodiment of the figures, the optical junction or distribution box 100 comprises the fiber routing insert 1 housed in the compartment 160, with the first floor 10 laying on the base 110, and the side walls 120 surrounding the first floor 10 and the second floor 40.

However, in further embodiments which are not shown in the figures, the fiber routing insert 1 can be formed integrally with the base 110 and the side walls 120. Specifically, the first floor 10 may define the base 110 of the junction or distribution box 100. In such embodiments, a fiber routing insert 1 as described herewith is not required, but the same components as described for the insert 1 shall be present in the junction or distribution box 100.

Therefore, for simplicity the invention will be described in the following referring mainly to the fiber routing insert 1. However, the features of the fiber routing insert 1 shall be intended as applicable also to a junction or distribution box 100 as a whole.

The optical junction or distribution box 100 comprises one or more first optical ports 130 and one or more second optical ports 140 formed in the side walls 120 and/or in the base 110 and/or in the cover.

Each first optical port 130 is arranged to provide an optical fiber access to the first path A, and similarly each second optical ports 140 is arranged to provide an optical fiber access from the second path B.

According to one embodiment, each first optical port 130 is arranged, referring to the first direction X-X, between the first floor 10 and the second floor 40 as well as the one or more second optical ports 140.

In the embodiment of FIG. 7, the first optical ports 130 and the second optical port 140 are spaced apart along the transverse direction Y-Y.

The invention claimed is:

1. A fiber routing insert for an optical junction or distribution box, comprising:
    a first floor;
    first guide elements extending, along a spacing direction transversal to the first floor, from the first floor to first ceiling portions, the first guide elements defining a first path on the first floor configured to receive optical fibers, the first path defining a figure-eight fiber locking path;
    a second floor arranged at a raised position relative to the first floor and spaced apart from the first floor along the spacing direction, the second floor comprising a splicing area for splicing the optical fibers on the second floor;
    second guide elements arranged on the second floor, the second guide elements defining a second path on the second floor configured to receive optical fibers,
    a connecting element configured to guide optical fibers from the first path to the second path,
    wherein:
    the first ceiling portions define the second floor.

2. The fiber routing insert according to claim 1, wherein the first floor is arranged at a lowered position relative to the second floor along the spacing direction.

3. The fiber routing insert according to claim 1, wherein the first floor and the second floor are associated respectively to a first plane and a second plane which are at a constant distance.

4. The fiber routing insert according to claim 1, wherein the first guide elements comprise:
    first lower central walls and second lower central walls projecting from the first floor and mutually spaced apart along a transversal direction perpendicular to the spacing direction;
    lower lateral walls projecting from the first floor and arranged around the first lower central walls and the second lower central walls,
    the first lower central walls, the second lower central walls, and the lower lateral walls defining therebetween the first path.

5. The fiber routing insert according to claim 4, wherein:
    the first lower central walls and the second lower central walls have circular profiles defining respectively a first lower loop and a second lower loop;
    the lower lateral walls have complementary profiles with respect to the circular profiles of the first lower central walls and the second lower central walls;

the first guide elements define with the lower central walls and the lower lateral walls the figure-eight fiber locking path of the first path.

6. The fiber routing insert according to claim 4, wherein the first guide elements comprise an insertion element configured to insert the optical fiber into the first path between the first lower central walls and the second lower central walls along an insertion direction perpendicular to the transversal direction.

7. The fiber routing insert according to claim 4, wherein the second guide elements project from the first guide elements along the spacing direction away from the first floor.

8. The fiber routing insert according to claim 4, wherein the second guide elements comprise:
first upper central walls and second upper central wall projecting from the ceiling portions respectively from the first lower central wall and the second lower central wall;
upper lateral walls projecting from the ceiling portions respectively on the lower lateral wall;
the first upper central walls, the second upper central walls, and upper lateral walls defining therebetween the second path.

9. The fiber routing insert according to claim 1, wherein:
the first guide elements are formed integrally in one piece with the first floor; or
the first guide elements are removably attached to the first floor.

10. The fiber routing insert according to claim 1, wherein:
the second guide elements are formed integrally in one piece with the first guide elements; or
the second guide elements are removably attached to the first guide elements.

11. The fiber routing insert according to claim 1, wherein the connecting element is configured to raise the optical fibers from the first floor to the second floor along a connecting path crossing at a raised position the optical fibers at insertion into the first path.

12. The fiber routing insert according to claim 1, wherein the second guide elements define with the second path a routing area.

13. An optical junction or distribution box, comprising:
a fiber routing insert comprising
a first floor;
first guide elements extending, along a spacing direction transversal to the first floor, from the first floor to first ceiling portions, the first guide elements defining a first path on the first floor configured to receive optical fibers, the first path defining a figure-eight fiber locking path;
a second floor arranged at a raised position relative to the first floor and spaced apart from the first floor along the spacing direction, the second floor comprising a splicing area for splicing the optical fibers on the second floor, the first ceiling portions define the second floor,
second guide elements arranged on the second floor, the second guide elements defining a second path on the second floor configured to receive optical fibers,
a connecting element configured to guide optical fibers from the first path to the second path;
a base associated to the first floor of the fiber routing insert;
side walls projecting from the base and surrounding the fiber routing insert,
one or more first optical ports, each first optical port providing a fiber access to the first path,
one or more second optical ports, each second optical port providing a fiber access to the second path.

14. The optical junction or distribution box according to claim 13, wherein a cover is coupled to the side walls on the opposite to the base and is configured to define with the base and the side walls a housing volume for the fiber routing insert.

15. The optical junction or distribution box according to claim 14, wherein the cover is configured to close an open compartment of the optional junction or distribution box in which the fiber routing insert is comprised.

16. The optical junction or distribution box according to claim 14, further comprising fastening elements configured to removably fasten the cover to the side walls, to the base, or to both.

17. The optical junction or distribution box according to claim 13, wherein the fiber routing insert is integrally formed with the base and the side walls.

* * * * *